United States Patent [19]

Hall et al.

[11] 4,207,945

[45] Jun. 17, 1980

[54] RECOVERING PETROLEUM FROM SUBTERRANEAN FORMATIONS

[75] Inventors: Wilbur L. Hall, Bellaire; Charles R. French, Bridgeport, both of Tex.; Ching H. Wu, Golden, Colo.; Alfred Brown, Houston, Tex.

[73] Assignee: Texaco Inc., White Plains, N.Y.

[21] Appl. No.: 1,520

[22] Filed: Jan. 8, 1979

[51] Int. Cl.² .............................................. E21B 43/24
[52] U.S. Cl. ...................................... 166/272; 166/263
[58] Field of Search ............... 166/272, 303, 266, 267, 166/263

[56] References Cited

U.S. PATENT DOCUMENTS

| | | | |
|---|---|---|---|
| 2,862,558 | 12/1958 | Dixon | 166/272 |
| 3,347,313 | 10/1967 | Matthews et al. | 166/272 |
| 3,593,790 | 7/1971 | Herce | 166/272 X |
| 3,768,558 | 10/1973 | Allen et al. | 166/272 |
| 3,768,559 | 10/1973 | Allen et al. | 166/272 |
| 4,004,636 | 1/1977 | Brown et al. | 166/272 |
| 4,026,358 | 5/1977 | Allen | 166/272 |
| 4,119,149 | 10/1978 | Wu et al. | 166/272 X |

*Primary Examiner*—Stephen J. Novosad
*Attorney, Agent, or Firm*—Carl G. Ries; Robert A. Kulason; Gregory A. Cone

[57] ABSTRACT

A process for enhanced recovery of petroleum from subterranean formations wherein a vapor mixture of steam and a petroleum fraction containing naturally occurring phenolic and carboxylic compounds is injected via an injection well, and a mixture of steam condensate and petroleum is produced via a production well.

6 Claims, No Drawings

RECOVERING PETROLEUM FROM SUBTERRANEAN FORMATIONS

BACKGROUND OF THE INVENTION

The present invention relates to recovery of crude petroleum from subterranean formations. Particularly, it relates to a process for recovering crude petroleum from consolidated or unconsolidated subterranean formations wherein mixtures of steam and petroleum fractions containing naturally occurring phenolic compounds and/or carboxylic acid compounds, and which petroleum fractions are volatile in the presence of steam at injection pressures, are injected into said subterranean formations via injection wells, and wherein produced crude, steam condensate, and injected petroleum fractions are recovered from wells producing from the same subterranean formations.

It is known, generally, to produce petroleum oils, tar sand bitumen, and related petroleum hydrocarbons from shale, sandstone, unconsolidated sand, limestone, and other subterranean formations by injecting steam into a first well for heating the petroleum in such formations and forcing such petroleum to a second well from which such petroleum is produced. Such processes are particularly useful for recovering heavy crudes (low API gravity) and bitumens wherein the heat of said injected steam, when imparted to the crude petroleum, reduces the petroleum viscosity and thereby increases mobility. In this method of recovering heavy petroleum from subterranean formations, a bank of petroleum may build up in a cold zone ahead of the advancing steam. This bank of petroleum restricts flow through the subterranean formation, requiring high pressures for moving the petroleum to the producing well.

An improvement to the process of recovering petroleum employing steam injection was proposed in U.S. Pat. No. 2,862,558, granted Dec. 2, 1958 to Henry O. Dixon. In Dixon, a vapor mixture of superheated steam and a normally liquid hydrocarbon solvent are injected, via an injection well, into a subterranean formation for forcing petroleum to a second well from which petroleum is produced. The hydrocarbon solvents contemplated by Dixon are those which, when admixed with petroleum, reduce the viscosity of the mixture considerably below that of the petroleum in place, thus increasing mobility of the mixture through the subterranean formation. Such solvents ordinarily have the characteristics of such liquids as kerosine, gasoline, jet fuel, stoddard solvent, benzene, xylene, toluene, etc.

Another improvement to the process of recovering petroleum employing steam injection was proposed in U.S. Pat. No. 4,119,149, granted Oct. 10, 1978 to Wu, et al. In Wu, et al, the process comprises flashing a mixture of steam condensate and crude petroleum from a production well for production of a liquid petroleum phase and a vapor phase comprising steam and hydrocarbon vapor, condensing said vapor phase for recovery of said flashed hydrocarbon as a liquid; and injecting said recovered hydrocarbon with additional steam, via an injection well, into said subterranean formation for recovery of additional crude petroleum. In this process, the injected hydrocarbon serves to reduce the viscosity of crude petroleum when admixed therewith.

SUMMARY OF THE INVENTION

Now, according to the present invention, we have discovered an improved method for recovering petroleum from subterranean formations.

In one embodiment of the present invention, the improved process comprises:

(a) injecting a vapor mixture of steam and a petroleum fraction containing naturally occurring compounds having phenolic and/or carboyxllic functional groups into a crude petroleum bearing subterranean formation via at least one injection well; and (b) producing crude petroleum from said subterranean formation via at least one production well.

In an alternative embodiment of the present invention, an amount of said steam-petroleum fraction vapor mixture, equivalent to at least about 10 percent of the pore volume of that portion of said subterranean formation through which said steam-petroleum fraction mixture shall flow to said production well, is injected via said injection well. Upon injection, said steam-petroleum fraction mixture is allowed to sit in said subterranean formation, without imposed pressure gradients to cause flow through said subterranean formation, for a period of at least about 24 hours and preferably about 24 to 200 hours. Upon allowing the injected steam-petroleum fraction mixture to sit for the selected period, injection of an injection fluid (preferably steam or a steam-petroleum fraction mixture) into the injection well is initiated, and production of crude petroleum from a production well is begun.

Advantages of the process of the present invention over processes of the prior art include increased displacement of petroleum from a subterranean formation for a given volume of injected steam-petroleum fraction mixture. This and other advantages of the process of the present invention will be discussed in the detailed description of the invention which follows.

DETAILED DESCRIPTION OF THE INVENTION

Many crude petroleum oils, particularly those denominated as "naphthenic" in character, naturally contain small amounts of carboxylic acid compounds. Such naturally occurring compounds are commonly referred to as "naphthenic acids." Additionally phenolic compounds often occur naturally in crude petroleum. It is not uncommon for such carboxylic acids and phenolic compounds to both occur in the same crude petroleum.

The major portion of "naphthenic acids," when present in a crude petroleum, are volatile, and boil within the rather narrow boiling range of about 475°–575° F. At least a portion of naturally occurring carboyxlic acid compounds and phenolic compounds have properties for enhancing production of petroleum from a subterranean formation when such petroleum fraction is injected with steam, as a vapor mixture, into such subterranean formation.

Particularly, use of such a petroleum fraction improves the response to steam injection such that more petroleum is produced from the subterranean formation in earlier stages of a steam flooding cycle. This discovery forms the basis of our invention.

Petroleum bearing formations for which the process of the present invention is useful include those which may be produced employing steam flooding techniques. Particularly, the present invention may be applied to petroleum bearing formations which are depressured or underpressured formations, containing relatively heavy (low gravity) petroleum oils, tar sands or other bitumen containing formations, and formations near the earths surface which will not contain high pressures.

The temperature of the steam-petroleum fraction mixtures of the present invention injected into a subterranean formation for enhancing recovery of crude petroleum is selected to maintain the mixture in the vapor phase at injection pressure and to carry sufficient heat into the subterranean formation to produce an advancing steam front. Such an advancing steam front has associated therewith a cooler bank of petroleum. The temperature of the injected mixture will be sufficient to maintain a steam phase at formation pressure, and usually will be sufficient to provide some superheat at injection pressures. For example, temperatures of about 225° F. may be used for formations at about atmospheric pressure, and temperatures in the range of 470°–600° F. may be used in formations with pressures of about 500 psig. Such temperatures for the injected steam and petroleum fraction mixture may be adjusted for the injection pressure of a particular subterranean formation from which petroleum is to be produced.

The proportion of said petroleum fraction of the present invention to steam in the injected mixture may vary over a relatively large range of liquid volume ratios of about 1:3 to about 1:100 petroleum fraction to steam respectively. Preferably at injection conditions of temperature and pressure, the injected mixture is in the vapor phase, and the liquid volume ratio of petroleum fraction to steam is in the range of about 1:10 to 1:100.

When said petroleum fraction comprises a large proportion of the injected vapor, the acidic functions present therein are relatively more plentiful and their action within the formation is increased such that crude petroleum production is enhanced. However, the amount of heat per volume of injected vapor is decreased. When such petroleum fractions comprise a very small proportion of injected vapors, the action of acidic compounds is subtantially curtailed. Consequently, liquid volume ratios of petroleum fraction to steam in the injected vapor in the range of about 1:10 to about 1:50 respectively are preferred for providing a good balance of heat input and amount of acidic compound containing petroleum fraction per volume of injected vapor for enhancing production of petroleum from the formation. Most preferred is liquid volume ratio of petroleum fraction to steam of about 1:20 respectively in the injected vapor.

In the process of the present invention, the acidic compound containing petroleum fraction may be injected along with steam at commencement of the steam flood; may be injected after the steam front has reached the producting well, or may be injected when the steam front is in an intermediate position between the injection well and the production well.

When the petroleum fraction is injected at commencement of steam flooding, a bank of petroleum oil will accumulate rapidly. The injected petroleum fraction containing acidic components will dissolve into this bank of petroleum, improving recovery of such petroleum from the formation. However, the accumulated solvent bank may increase pressure drop through the formation, thus requiring increased injection pressure to drive the petroleum to the production well.

When the petroleum fraction is injected after the steam front has reached the production well, a substantial proportion of the crude petroleum will have been produced by steam flooding alone and the formation temperature will be increased. Thus, contact of the acidic compound containing petroleum fraction with remaining petroleum will be increased.

A petroleum fraction containing naturally occurring acidic components and useful in the process of the present invention may be obtained from petroleum crude oils. A major protion of naturally occurring organic acids present in crude petroleum oils boil generally in the range of about 475° F. to about 575° F. A petroleum fraction rich in such acidic compounds may be obtained by fractionating crude oil to obtain a fraction boiling in the 475°–575° F. range. Another method for obtaining a petroleum fraction rich in acidic compounds is steam distillation. Although the naturally occurring acidic compounds boil in the 475°–575° F. range, under conditions of steam distillation such compounds are relatively more volatile and tend to steam distill along with lower boiling hydrocarbons. By using a steam distillation method, the recovered petroleum fraction comprises a mixture of hydrocarbons and acidic compounds which are volatile in the presence of steam such that a mixture of steam and such steam distilled petroleum fraction may be injected as a vapor into a subterranean formation.

Crude petroleum oils from different sources vary considerably in the amount of naturally occurring acidic compounds present. Preferably, the petroleum fractions to be used in the process of the present invention are obtained from crude oils containing substantial amounts of acidic compounds. Naphthene based crude oils generally contain substantial amounts of naturally occurring acidic compounds.

The total volume of petroleum fraction injected into a subterranean formation according to the method of the present invention is sufficient to result in increased production of petroleum from the formation, and will be proportional to the pore volume (porosity $[\phi]$ times volume of formation) and the total volume of the formation swept by the injected steam-petroleum fraction mixture flowing to the production well.

The concentration of naturally occurring acidic compounds in petroleum fractions recovered by fractional distillation or by steam distillation are rather low, generally less than about 10 wt.%. Consequently, for practical increased petroleum recoveries, the total injected volume of light hydrocarbon should be in the range of about 1–100 percent of the total pore volume in that portion of the formation swept by the steam-petroleum fraction mixture. Preferably, the total amount of such petroleum fraction injected will be in the range of about 5–20 percent of the pore volume in that portion of a formation swept by the steam-petroleum fraction mixture. Should the volume of injected petroleum fraction be less than 1 percent of the swept pore volume, no substantial increase in petroleum production will occur over that obtained by steam flooding alone. Use of a volume of injected petroleum fraction exceeding 100 percent of the swept pore volume is not economically justified by increased petroleum production.

A series of laboratory tests were performed to demonstrate the utility of the process of the present invention for recovering petroleum from earth formations. Comparison tests, using steam flooding alone, were also performed to demonstrate the advantage of the process of the present invention compared to processes of the prior art. These laboratory tests are described and their results reported in the following example.

EXAMPLE I

Three sand packs were prepared in linear sand pack cells 17.8 cm long and 3.6 cm in diameter. These sand packs were comprised of 170–230 mesh silica sand, and had a porosity ($\phi$) of 0.37. Each sand pack was saturated with Aurignac crude oil and flooded to a cold water residual such that the initial oil saturation of the sand packs pore volume ($S_{oi}$) was 0.54–0.59, and the initial water saturation ($S_{wi}$) was 0.46–0.41.

A crude oil from the San Ardo field was steam distilled at a pressure of about 200 kPa to produce a vaporized petroleum fraction. This petroleum fraction, which was condensed at a temperature of about 38° C., contained about 20 volume percent boiling in the 475°–575° F. range, and contained about 0.5 wt.% carboxylic acids and phenols. Physical tests of this petroleum fraction are given in Table I, below.

TABLE I

| Properties of Steam Distilled Petroleum Fraction | |
| --- | --- |
| Carboxylic Acids & Phenols | 0.5 wt. % |
| Paraffin | 90.8 vol. % |
| Olefin | 5.6 vol. % |
| Aromatic | 3.6 vol. % |
| ASTM Distillation °F. | |
| IBP/0 | 203/257 |
| 10/20 | 280/324 |
| 30/40 | 351/374 |
| 50 | 401 |
| 60/70 | 424/446 |
| 80/90 | 478/529 |
| 95/EP | 574/783 |

In a first experimental Run, steam at a mass flux of 66.42 kg/hr-m² and said petroleum fraction at a mass flux of 3.11 kg/hr.-m² were combined at a temperature of about 200° C. and injected into the first prepared said pack while holding a back pressure of 1,482 kPa on the linear sand pack cell. Flow of this mixture of steam and petroleum fractions was continued for a time sufficient to inject a volume of petroleum fraction equivalent to 0.1 pore volumes (Vp) of the sand pack. Upon injection of said petroleum fraction equivalent to 0.1 Vp, injection of said petroleum fraction was terminated, and flow of steam at a rate of 66.42 kg/hr-m² was continued for a time until a volume of liquid was produced from the sand pack equivalent to 6.0 Vp. Upon completion of this flooding process, residual oil saturation ($S_{or}$) of the sand pack pore volume was found to be 0.16, compared to initial oil saturation ($S_{oi}$) of 0.55. Results of this experiment are shown as Run 1 in Table II, below.

In a second experimental run, steam at a mass flux of 66.42 Kg/hr-m² and said petroleum fraction at a mass flux of 3.11 Kg/hr-m² were combined at a temperature of about 200° C. and injected into the first prepared sand pack while holding a back pressure of 1,482 kPa on the linear sand pack cell. Flow of this mixture of steam and petroleum fraction was continued for a time sufficient to inject a volume of petroleum fraction equivalent to 0.1 pore volumes (Vp) of the sand pack. Upon injection of said petroleum fraction equivalent to 0.1 Vp, injection of the mixture was stopped and the sand pack was shut-in without flow therethrough for a period of about 24 hours. Upon expiration of 24 hours, flow as re-established and steam was injected into the sand pack at a temperature of about 200° C. against a pressure of 1,482 kPa, at a flow rate of 66.42 Kg/hr-m². Flow of steam was maintained until the volume of liquid produced from the sand pack was equivalent to 6.0 Vp. Upon completion of this flooding process, residual oil saturation ($S_{or}$) of the sand pack pore volume was found to be 0.10, compared to initial oil saturation ($S_{oi}$) of 0.53. Results of this experiment are shown as Run 2 in Table II, below.

For comparison with the process of the present invention, a third sand pack ($\phi=0.37$, $S_{oi}=0.55$, $S_{wi}=0.45$) was flooded with steam, at a temperature of 200° C., a back pressure of 1,482 kPa, and a steam mass flux of 66.42 Kg/hr-m², for a period until a volume of liquid was produced from the sand pack equivalent to 6.0 Vp. Upon completion of this steam flood, residual oil saturation ($S_{or}$) of the sand pack pore volume was found to be 0.21, compared to initial oil saturation ($S_{oi}$) of 0.55. Results of this comparison are shown as Run 3 in Table II, below.

TABLE II

| RUN No. | 1 | 2 | 3 |
| --- | --- | --- | --- |
| Initial Oil Saturation, ($S_{oi}$) | 0.555 | 0.53 | 0.55 |
| Steam injection flux (Kg/hr-m²) | 66.42 | 66.42 | 66.42 |
| Injection Temperature, °C. | 200 | 200 | 200 |
| Cell Pressure, kPa | 1,482 | 1,482 | 1,482 |
| Petroleum fraction injection flux (kg/hr-m²) | 3.11 | 3.11 | 0 |
| Petroleum fraction injected (Vp) | 0.1 | 0.1 | 0 |
| Soak period, hrs. | 0 | 24 | 0 |
| Residual Oil Saturation ($S_{or}$) at | | | |
| 1.0 Vp produced liquids | .545 | .525 | .545 |
| 2.0 Vp produced liquids | .495 | .52 | .545 |
| 3.0 Vp produced liquids | .43 | .43 | .545 |
| 4.0 Vp produced liquids | .37 | .325 | .50 |
| 5.0 Vp produced liquids | .265 | .20 | .30 |
| 6.0 Vp produced liquids | .16 | .10 | .205 |

As can be seen from Table II, use of the process of the present invention (Runs 1 and 2) results in substantially less residual oil saturation ($S_{or}$) in the sand pack, than the residual oil saturation ($S_{or}$) remaining after steam flood alone (Run 3). Further, comparing Runs 1 and 2, it is seen that injection of the acidic compound containing petroleum fraction with steam followed by a soak period (Run 2) results in substantially reduced $S_{or}$ compared to the process wherein no soak period is allowed (Run 1).

FIELD TEST

The enhanced petroleum process of the present invention is applied in a field test as described below. A naphthenic crude oil is fractionated in a fractional distillation column to obtain a crude naphthenic acid containing petroleum fraction boiling in the range of 475°–575° F. Such petroleum fraction is injected into superheated steam to form a vapor mixture which is injected, via an injection well, into a subterranean formation. Simultaneously, production of fluid from a production well in said formation is commenced. Flow of said steampetroleum fraction mixture is continued until from about 0.05 to about 0.2 Vp of said petroleum fraction is injected into said formation, at which time flow of said mixture into said formation, and production of fluids from said formation are terminated. Said injected petroleum fraction is allowed to soak in said formation for a period of 24–200 hours. At the end of said soak period, flow of steam into said injection well and flow of produced fluids from said production well are re-established and continued for production of additional petroleum from the subterranean formation.

It is to be understood that modifications and variations of the process described in the foregoing specification will occur to those skilled in the art, which modifications and variations are within the spirit and scope of the present invention. Consequently, the only limitations of the present invention intended are those included in the appended claims.

We claim:

1. In a process for recovery of petroleum from a subterranean formation wherein steam is injected via an injection well into said subterranean formation and wherein petroleum is produced via a production well from said formation; the improvement which comprises:

injecting with said steam a petroleum fraction containing naturally occurring compounds selected from the group consisting of phenolic compounds, carboxylic acids, and mixtures thereof, which petroleum fraction is volatile in the presence of said steam, in an amount sufficient for increasing production of petroleum from said subterranean formation.

2. The process of claim 1 wherein the amount of said petroleum fraction injected with steam into said subterranean formation is equivalent to about 1–100 percent of the pore volumr of that portion of said subterranean formation through which said steam and petroleum fraction flow to said production well.

3. The process of claim 2 wherein the steam and petroleum fraction injected into said subterranean formation are at an injection pressure sufficient to force a flow of steam, petroleum fraction, and petroleum toward said production well, and wherein said steam and petroleum fraction are injected at a temperature sufficient to maintain said steam in the vapor phase at said injection pressure.

4. The process of claim 1 wherein said steam and petroleum fraction are injected into said subterranean formation in an amount equivalent to at least about 10% of the pore volume of that portion of said subterranean formation through which said steam and petroleum fraction flow to said production well, wherein upon injection, said steam and petroleum fraction are allowed to sit in said subterranean formation without imposed pressure gradients for a selected period of at least 24 hours, and wherein upon expiration of said selected period an injection fluid is injected via said injection well for flowing said injected steam and petroleum fraction along with petroleum from said subterranean formation to said production well.

5. The process of claim 4 wherein said injection fluid is selected from the group consisting of steam and a mixture of steam and said petroleum fraction.

6. The process of claim 5 wherein the amount of said petroleum fraction injected with steam into said subterranean formation is equivalent to about 1–100 percent of the total pore volume of that portion of said subterranean formation through which said steam and petroleum fraction flow to said production well.

* * * * *